Jan. 12, 1965   K. NEUDECKER ETAL   3,165,037
CONTROL FOR MOTION PICTURE CAMERA
Filed Sept. 13, 1961   5 Sheets-Sheet 1

INVENTORS:
FRIEDRICH WINKLER
KARL NEUDECKER
BY
Connolly and Hutz
ATTORNEYS

Jan. 12, 1965   K. NEUDECKER ETAL   3,165,037
CONTROL FOR MOTION PICTURE CAMERA
Filed Sept. 13, 1961   5 Sheets-Sheet 2

INVENTORS:
FRIEDRICH WINKLER
BY   KARL NEUDECKER
Connolly and Hutz
ATTORNEYS

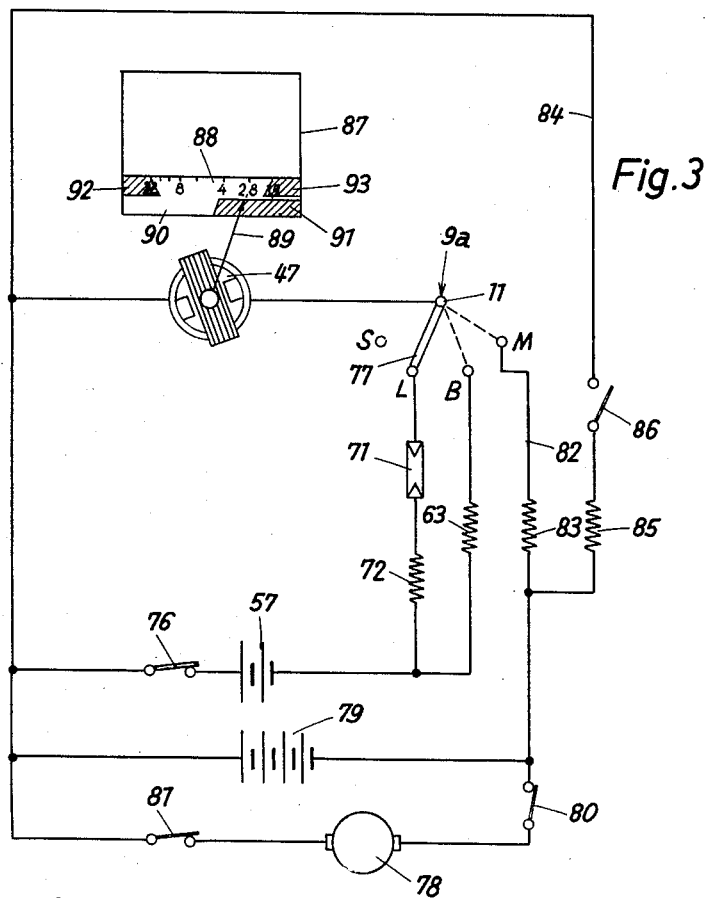
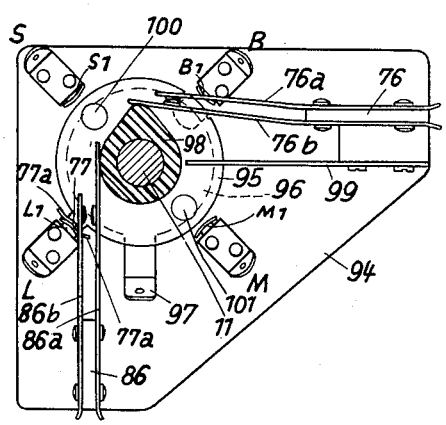

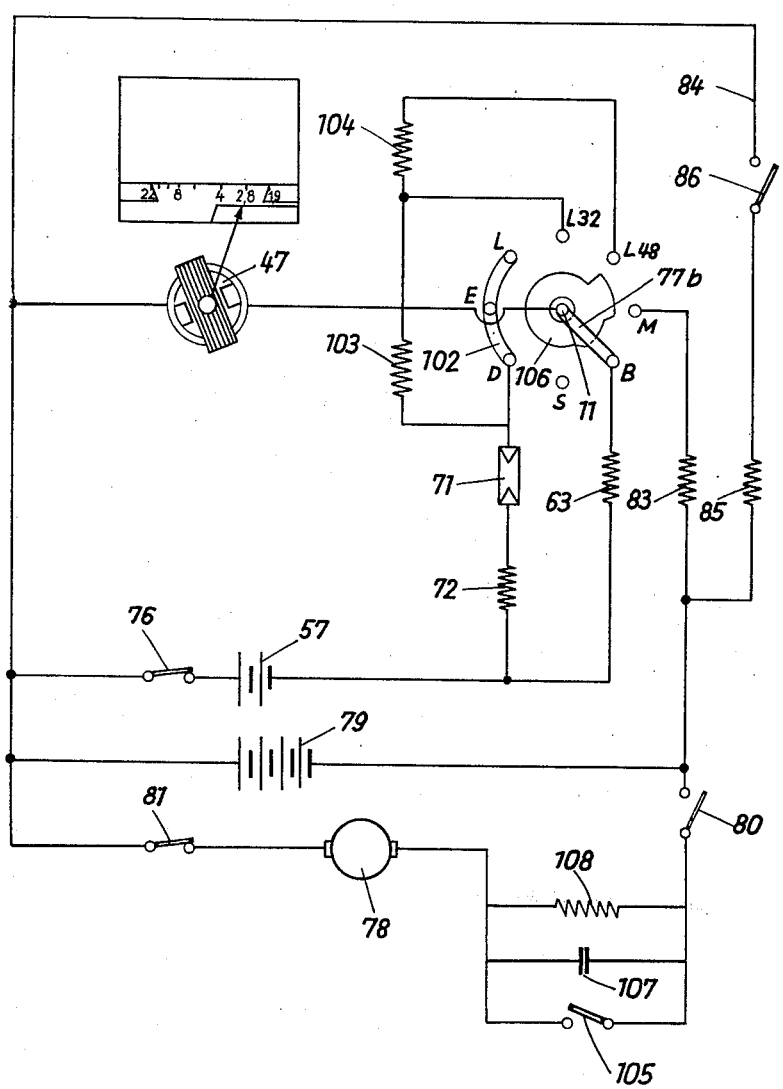

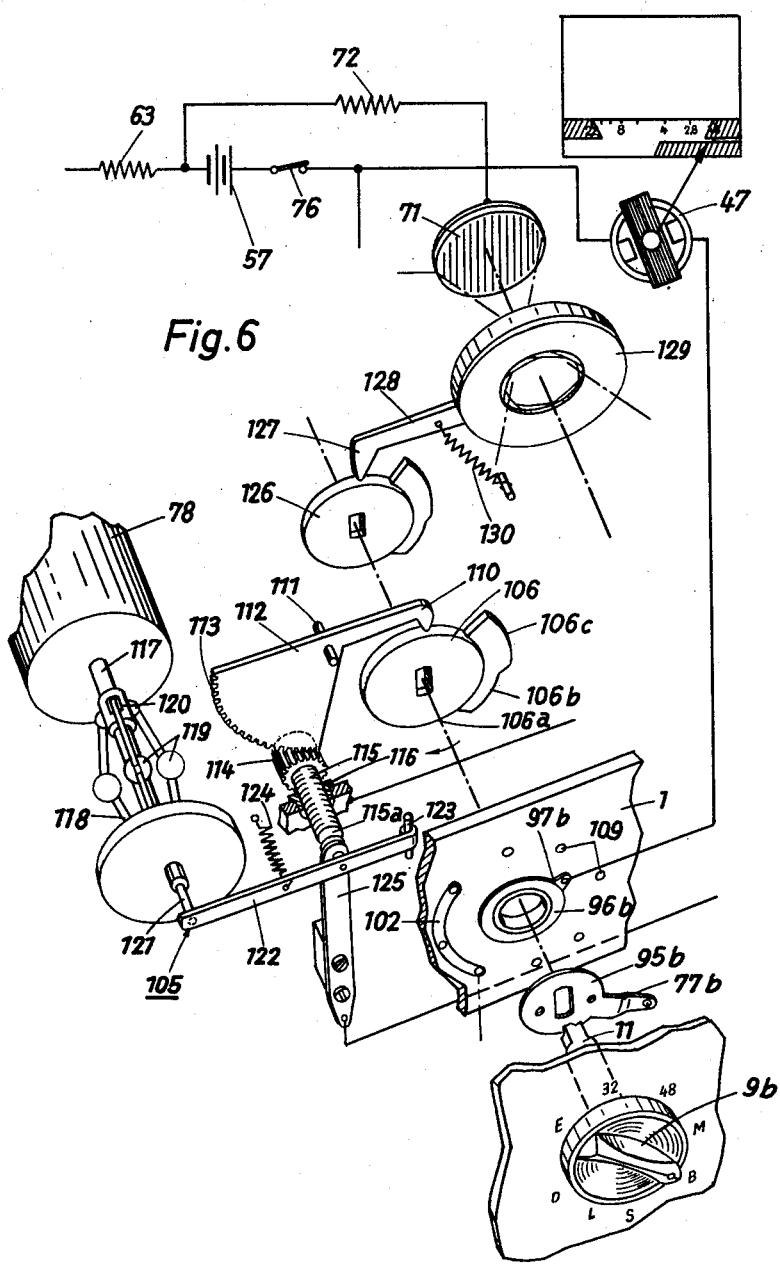

3,165,037
CONTROL FOR MOTION PICTURE CAMERA
Karl Neudecker and Friedrich Winkler, Munich, Germany, assignors to Agfa Aktiengesellschaft, Leverkusen-Bayerwerk, Germany, a corporation of Germany
Filed Sept. 13, 1961, Ser. No. 137,789
Claims priority, application Germany, Sept. 23, 1960,
A 35,647
17 Claims. (Cl. 95—10)

This invention relates to a motion picture camera with a built-in battery-powered exposure meter for automatically regulating the diaphragm opening, and it more particularly relates to a control arrangement for a camera of this type.

In motion picture cameras of this type it is known to provide a control for varying the speed of the motor and for selecting the proper circuit of the exposure meter which corresponds to the selected speed. It has also been suggested that the exposure meter might be used for testing the voltage of the batteries mounted in the camera casing. In these arrangements control elements used in switching from automatic to manual diaphragm control can also be set in a testing position in which the galvanometer is connected through a resistor to the battery while the photosensitive transducer is by-passed.

Heretofore, separate control elements have been used for adjusting the camera to its different operating conditions and for testing the battery. In fact most individual functional aspects of the camera are controlled by completely separate adjusting devices. It is therefore necessary when using cameras, which may be adjusted to provide a number of different modes of operation, to carefully ascertain before using the camera that it is ready for operation in the desired manner. However, a disadvantage of such separate control devices is the possibility that some of the electrical devices controlled thereby might be left unnecessarily connected with the source of current to cause an unnecessary drain upon the battery, thereby discharging it within a relatively short period of operation.

In accordance with this invention a control arrangement for a motion picture camera of the type described includes a consolidated control device or switch having a number of separate positions for controlling the various functions of the camera, such as individual frame exposure and motion picture exposure. This consolidated switch also includes a battery testing position for connecting the galvanometer of the exposure meter directly to the battery through a testing resistor, and it also includes a safety position in which the battery is disconnected from all circuit elements and thereby isolated. This arrangement also permits only one adjustment to be made to provide any desired operational condition, including an adjustment to a safety condition. This prevents any necessary control adjustment from being overlooked, and greatly reduces the consumption of battery current by preventing the usual mistakes that might otherwise occur. Preferably, the consolidated control in the safety position also operates a disconnecting or inactivating device for the camera mechanism to prevent any unintentional operation of the camera exposure mechanism in this safety position.

It is also advantageous to provide a return spring reacting upon the switch when it is adjusted to the battery testing positions to urge it from this position toward the safety position. In a preferred embodiment of this invention the consolidated control includes a lug, which engages the central power contact or pole of a double-throw switch thereby contacting it alternatively either the automatic control circuit of the galvanometer or a battery testing circuit. In the safety position the pole is isolated from both of the aforementioned contacts by maintaining it in an intermediate position; and in the testing position which should be as close as possible to the safety position of the switch, the pole is contacted with the battery testing contact. In all other operating positions of the switch the central pole or intermediate contact is allowed to be normally urged into contact with the automatic control contact.

A relatively simple control arrangement of this type is provided by utilizing a disc from which operating lugs extend by, for example, being bent away from the plane of the control disc. These lugs extend into the path of the camera operating mechanism for locking and unlocking it in the safety position. The switching disc is interlocked with the manual camera operating mechanism by a toggle spring arrangement.

With motion picture cameras of this sort, which are driven by an electric motor operated by a separate battery, the consolidated switch also includes an additional testing position in which the motor battery is connected to the exposure meter galvanometer to ascertain its condition while the motor circuit to the battery is interrupted. This eliminates the need for a mechanical interlock with the camera operating device in the safety position because the consolidated switch also includes a contact in the motor circuit which cannot be operated while the switch is adjusted to the safety position. In the motor testing position a resistor corresponding to the value of the resistance of the motor is connected in parallel with the galvanometer circuit. This permits the motor to be tested under load conditions.

A galvanometer scale which may be made visible in the viewfinder can then include joint indicia for indicating exposure and battery conditions. The testing circuits for the galvanometer can accordingly be adjusted by means of compensating resistors to permit the same scale to be used to show the minimum operative voltage which will adequately operate the exposure control device and the motor.

In accordance with another form of this invention pertaining to battery-operated cameras, a double acting return spring is provided for returning the switch from both of the battery testing positions of the safety position. This type of return spring can be provided upon a rotatable portion of the switch; however, it is preferably mounted upon a fixed structure, and two pins upon a rotatable portion of the switch react against such stationary springs.

In accordance with a particularly effective form of this invention, the rotatable switch includes a distributor form of sliding contact which also acts as a cam member for operating additional contacts for performing different functions. This distributor form of contact is preferably a spring, which is resiliently mounted in a direction transverse to the direction of rotation of the switch, and it includes a detent which reacts with each of the contacts to engage it therewith.

In accordance with further aspects of this invention, the consolidated switch may be provided with a number of different positions corresponding to different speeds of the camera motor and with a device for compensating the exposure meter indicator in accordance with the different selected operating speeds. These compensating devices may be provided by resistors connected in series with the galvanometer corresponding to each of the particular motor speeds to which the switch is adjusted. It is also possible to connect light obscuring devices in front of the photoelectric transducer such as a variable diaphragm which is operated from the control switch, for example, by cam and follower elements.

Novel features and advantages of the present invention will become apparent to one skilled in the art from a reading of the following description in conjunction with the accompanying drawings wherein similar reference characters refer to similar parts and in which:

FIG. 3 is a schematic diagram of the electrical portions of the embodiments shown in FIG. 2 for a motion picture camera incorporating a battery operated motor drive;

FIG. 4 is a cross-sectional view taken through a four-position switch of the type schematically shown in FIG. 3;

FIG. 5 is a modified electrical diagram for an electrically driven motion picture camera similar to the type shown in FIG. 3, which is operable at variable speeds; and FIG. 6 is a perspective schematic diagram of a motion picture camera with variable operating speeds incorporating a variable dimming device connected in front of the photoelectric transducer.

Figure 1:
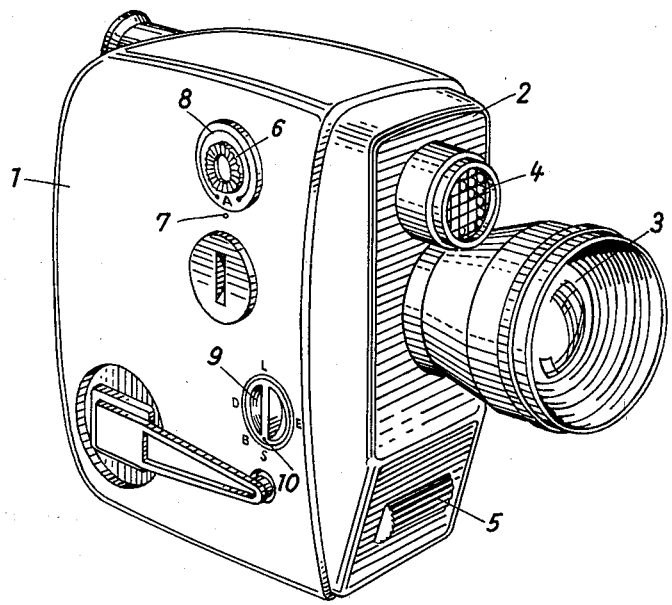
FIG. 1 is a perspective view of a motion picture camera which incoproates an embodiment of this invention.

In FIG. 1 is shown a motion picture camera including a casing 1 having a front head 2 from which an objective lens 3 extends. A photoelectric light sensing device 4 and a manual operating button 5 also extend from front end 2. An exposure control switch 6 is adjusted as shown in FIG. 1 with the symbol A disposed opposite index mark 7. In this position the automatic exposure regulating device for setting the lens diaphragm is activated. The diaphragm may also be manually electrically adjusted throughout the other portions of the range of scale 8. A consolidated control switch 9 including an index mark 10 may be set in the indicated various positions including "D" for continuous operation; "L" normal operation; "E" single frame exposure; "S" safety off and "B" battery testing.

Figure 2:
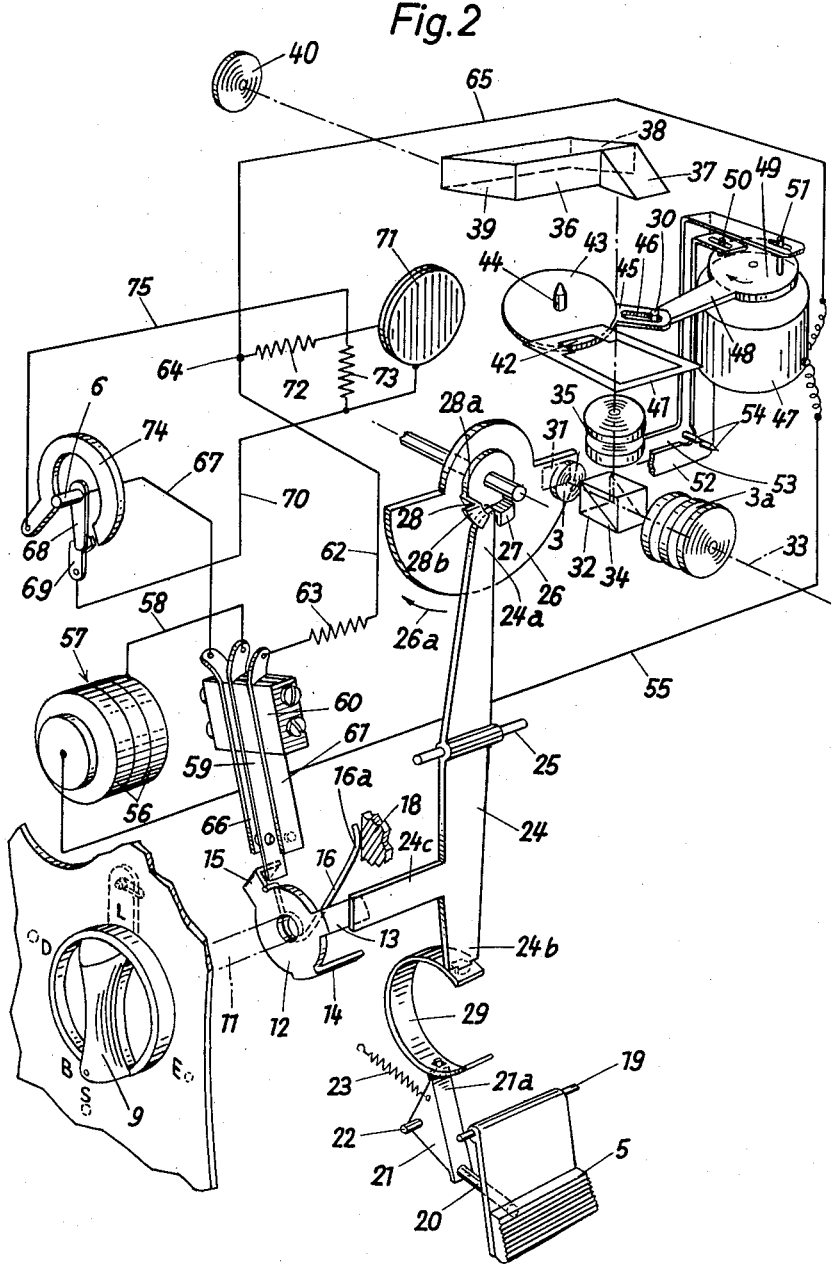
FIG. 2 is a perspective schematic diagram of electro-mechanical portions of the embodiment of this invention incorporated in the camera shown in FIG. 1.

As shown in FIG. 2, an actuating disc 12 is mounted upon switching shaft 11 which is rotated by knob 9. Disc 12 includes three switching lugs 13, 14 and 15 which are bent up from its plane. A torsion spring 16 wound around shaft 11 reacts between switch lugs 13 and 15, and end 16a of torsion spring 16 extends past lug 13 and reacts against stationary surface 18 within camera casing 1. From the safety position spring 16 is tensioned upon rotation of switch 9 toward the battery position to return it automatically to the safety position from the battery position when released.

Manual operating element 5 for actuating the exposure function of camera is made in the form of a lever, which is rotatably mounted upon a stationary rod 19. Release element 5 is connected to lever 21, which is rotatably mounted about stationary rod 22, and it is rotatably urged in a clockwise direction by tension spring 23. An intermediate exposure release lever 24 is rotatably mounted upon stationary pivot 25; and when the camera is not in operation, its upper end 24a is disposed in front of stop 27 extending from rotating shutter disc 26. In this position another stop projection 28 is disposed upon the opposite side of the upper end 24a of lever 24 with its outer flange or projection 28b disposed upon lug 28a in front of the path of motion of end 24a. However, when end 24a is adjusted a short distance away from disc 26, it does contact flange 28b.

The lower end 24b of exposure release lever 24, and the upper end 21a of triangular lever 21 are both connected to arcuate spring 29 wihch reacts against both of them in a direction to maintain them in positions to which they are adjusted in a toggle linkage arrangement. In the position shown in FIG. 2, release lever 5 is in the "off" position in which it is maintained; and lever 24 is maintained in the position locking rotary shutter 26. However, when triangular lever 21 is rotated in the clockwise direction by operation of manual exposure release 5, a line through the point of connection of elements 21a and 24a to spring 29 is moved to the rear left of pivot 25 which reverses the direction of the turning moment exerted by spring 29 upon lever 24 from the counter-clockwise to a clockwise direction. This moves projecting end 24a out of the path of movement of stops 27 and 28. Lever 24 also includes a switching arm 24c which cooperatively engages switching lugs 13, 14 and 15 of disc 12 in a manner later described in detail.

A supplementary lens 3a is mounted in front of rotary shutter disc 26, and a prism 32 is mounted in front of image aperture 31 in rotary shutter disc 26. Prism 32 includes a half silvered surface 34 inclined at an angle of 45 degrees to the optical axis 33 of the camera. Surface 34 permits a portion of the image illumination to enter image aperture 31 from objective lens 3. The other portion of the light admitted through lens 3 is reflected upwardly through a set of lenses 35 to viewfinder prism 37 which reflects the rays through reflecting surfaces 37, 38 and 39 to an eye piece 40 in which a laterally and vertically properly-oriented image of the area being photographed is displayed.

A mask 41 for limiting the area of the image displayed in the viewfinder to that actually photographed is arranged between lenses 35 and viewfinder prism 36. Mask 41 includes upon one of its edges a notch or recess 42 which is disposed over transparent plastic disc 43. Disc 43 is rotatably mounted about stationary pivot 44, and it carries a scale of indicia corresponding to the diaphragm openings of the camera. This scale is also visible in viewfinder 40. An operating arm 45 also extends from disc 43, and it is connected to the moving coil 49 of galvanometer 47 by engagement with lever 48 through its pin 30 which engages slot 46 of arm 45. Armature 59 of galvanometer 47 is also connected to diaphragm adjusting levers 52 and 53 through pin and slot couplings 50 and 51. Diaphragm adjusting levers 52 and 53 are respectively rotatably mounted upon stationary pivots 54, and they open or close, in the conventional manner, an adjustable diaphragm arranged along optical axis 33 in accordance with the amount of illumination detected by exposure measuring galvanometer 47.

A source of electric current is provided by two button battery cells 56. Galvanometer 47 is connected with the negative pole of the battery 57 formed by two button cells 56 through electrical lead 55. The positive pole of battery 57 is connected through electrical lead 58 with the center contact or movable pole 59 of switch 60 which includes three contacts 59, 61 and 66. Contact 61 is connected by lead 62 through testing resistor 63 to a junction point 64 and from there through electrical lead 65 to galvanometer 47. Contact 66 of switch 60 is connected with the movable contact 68 of potentiometer or variable resistor 6 as shown in FIG. 2, which illustrates the condition during automatic exposure or diaphragm regulation. Movable or sliding contact 68 rests upon contact element 69 which is connected to photoelectric resistor or photoelectric transducer 71. Transducer 71 is connected to galvanometer 47. When switch or potentiometer 6 is utilized for manual adjustment of the diaphragm sliding contact 68 lies upon arcuate resistor 74, which is connected through electrical lead 75, resistor 73, photoresistor 71 and resistor 72 with junction point 64 to the galvanometer. The exposure is therefore always set electrically by movement of galvanometer 47 either automatically by virtue of the varying resistance of photoelectric resistor 71 or by manual adjustment of the resistance of potentiometer 6. When arcuate resistor 74 is connected in the circuit, the effect of photoelectric transducer 71 is negligible; and does not affect substantially the setting of galvanometer 47.

Central contact 59 of switch 60 is resiliently biased towards the diaphragm control spring contact 66, and always lies in contact with it unless it is forcibly lifted. This is accomplished only in the safety position shown in FIG. 2 in which contact 59 is lifted slightly by switch arm 15 but not enough to force it into engagement with contact 61. When control switch 9 is then turned further clockwise against the force of spring 16, the testing circuit is closed by pole 59 contacting contact 61 which connects power contact 59 through contact 61 and resistor 63 to the galvanometer junction point 64. This energizes galvanometer 47 to rotate diaphragm 43 through an angle corresponding to the voltage of the battery 57. A mark may accordingly be provided upon diaphragm disc 43 to indicate whether or not the strength of the battery is still sufficient to accurately automatically regulate exposure. After testing the battery in this fashion and switch 9 is released, it is returned automatically to the safety position by the resilient force of torsion spring 15. In the safety position arm 13 of disc 12 lies in back of arm 24c of release lever 24 which makes it impossible to remove end 24a of lever 24 from in front of stop 27 of rotary shutter disc 26 even though lever 5 and triangular lever 24 may be permitted to rotate clockwise a short distance through a resiliency of arcuate spring 29.

When switch 9 is set in the position E for exposing single pictures, switch lug 14, which is disposed at a shorter radial distance from shaft 11, is disposed in back of lever arm 24c. This permits end 24a of lever 24, when manual exposure release element 5 is actuated, to rest within the axially extended plane of stop flange 28b. Stop 27 of rotary shutter 26 is thereby released, and rotary shutter disc 27 allowed to rotate through a single revolution before flange 28b is arrested upon the end of lever 24a, thereby permitting disc 24 to turn through one revolution.

When manual button 5 is then released, arcuate spring 29 rotates lever 24 towards disc 26 thereby permitting projection 24a to enter between flange 28b and disc 26b which allows a slight further rotation of disc 26 back into the position shown in FIG. 2 in which stop 27 is arrested upon lever end 24a. However, in this position end 24a should not be allowed to rub upon the surface of shutter disc 26, and where necessary a suitable stop should be provided to hold it a predetermined distance away from the surface of disc 26. In the single exposure position E of switch 9, lug 15 is removed from contact with central pole 59 of switch 60 thereby permitting the diaphragm control circuit to be electrically actuated either automatically or manually through the closure or contact of power pole 59 with diaphragm regulating contact 66.

In the normal motion picture position L of switch 9, arm 24c of lever 24 lies between switch lugs 14 and 15 thereby permitting the camera to be manually operated in the usual manner. Switch lugs 13 and 14 are shorter than lug 15, and they therefore do not contact switch pole 59, which allows the setting of the exposure regulating system to be undisturbed during normal motion picture taking. It is also noteworthy that tension spring 23 is just strong enough to independently return release lever 5 to its starting position. However, to force lever 24 back into its arresting position, a slight additional pressure and quick release must be exerted upon release lever 5 to allow release lever 24 to assume its arresting position in view of the toggle action of lever 24, spring 29 and triangular lever 21.

In the regular motion picture taking position L and in the continuous motion picture taking position D, contacts 59 and 66 are always maintained closed. In the continuous condition D switch lug 15 lies in front of lever arm 24c, which makes it necessary to first actuate the manual release 5 and then move switch 9 into position D. To release from continuous operation, switch 9 must be rotated away from position D to release lever arm 24c from switch lug 15.

In FIG. 3 is shown an electrical diagram for a motion picture camera including a battery operated motor. A switch 76 is connected between galvanometer 47 and battery 57, and this switch conditions the regulating circuit for automatic diaphragm control. Switch 9a is somewhat similar to switch 9 with the exception of elimination of mechanical aspects connected with mechanical release 5 and provisions for testing motor drive battery 79. Switch 9a includes a movable contact 77 which may be set in the positions S, L and B which are similar to those described and in additional position M for testing the motor battery.

In FIG. 3 the camera is operated by an electric motor 78 supplied by battery 79. In the circuit to motor 78 are included, a disconnecting switch 80 and a second disconnecting switch 81, which is closed when switch 9a is disposed in the L condition of FIG. 4 (not shown). In switch position M battery 79 is connected to galvanometer 47 and to compensating resistor 83 through switch arm 77 and electrical lead 82. Another compensating resistor 85 is connected in parallel with galvanometer 47 through electrical lead 84 and switch 86, which is maintained closed only in the motor battery testing position M. The value of resistor 85 is substantially equal to that of motor 78 to permit a test of battery 79 under its operating load condition. The value of resistor 83 is so arranged with respect to the minimum voltages of batteries 57 and 79 and the value of resistor 63 that galvanometer 47 displays the same indication of voltage in both testing positions B and M when batteries 57 and 59 are discharged to their lowest permissible values.

The viewfinder includes a scale 88 over which pointer 89 traverses in response to actuation by galvanometer 47. A white area 90 and a red area 91 are applied over indicating scale 88 pertaining to diaphragm openings in the viewfinder over which pointer 89 of galvanometer 47 moves. When pointer 89 lies over white field 90, the battery voltage is sufficient for ordinary exposure regulation by the camera when switch 9a is in battery testing positions B or M. However, the scale indicates that the battery is too weak and must be charged or replaced if pointer 89 remains within red field 91. In addition, red areas 92 and 93 are provided at both ends of diaphragm opening indicating scale 88, and these areas indicate that the illumination is insufficient for proper exposure.

In FIG. 4 are shown details of switch 9a including shaft 11 rotatably mounted within a plate 94 upon which contacts $F_1$, $B_1$, $M_1$ and $L_1$ are mounted. Contact $S_1$ is unconnected with any circuit, and used only as a detent for arresting the rotatable contact in the safety position. However, contacts $E_1$, $M_1$ and $L_1$ are respectively connected with photoelectric transducer 71, testing resistor 63 and testing resistor 83 as shown in FIG. 3. It should be noted that the physical arrangement of the contacts is not exactly in conformance with that described in FIG. 3. As shown in FIG. 4, contact disc 95 is secured to shaft 11; and it is connected through a sliding contact (not shown) with a contact disc 96, which is connected through terminal flange 97 with galvanometer 47. Flexible switching arm 77 is mounted upon rotatable contact disc 95 and is bent at right angle to the plane of disc 95. The central part of contact 77 is convex toward shaft 11, and edges 77a are diverted towards shaft 11. This facilitates the movement of the contacts over contact 77 and resiliently maintains them engaged with each other at each switching position.

Also mounted upon shaft 11 is a cam 98, which in positon L as shown in the drawing (FIG. 3), forces contact springs 76a and 76b of switch 76 into contact with each other and closes contacts 82a and 86b of switch 86 in position M. A reset spring 99 corresponding to spring 16 in FIG. 2 is also mounted upon plate 94. The free end of leaf spring 99 extends into the path of rotation of pins 100 and 101 mounted upon rotatable disc. When for example switch shaft 11 is turned counterclockwise from the position shown in FIG. 4 to position M, spring 99 is contacted by pin 101; and after the switch is released, pin 101 is urged automatically away from position M by spring 99. This spring reaction occurs in the opposite direction when switch 9a is rotated counterclockwise another 180 degrees to battery testing position B.

A modification of the electrical diagram is shown in FIG. 5, which makes provision for operating the electric motor driving the camera at different speeds as well as making provisions for operating the camera continuously and for single exposure by switching positions D and E, which are functionally similar to those shown in FIG. 2. To provide for operations D and E, the electrical portion of the diagram is not changed; and it is only necessary to extend the contact for arm 77b from position L along contacts track 102 to positions D and E as well as L. The mechanical portions of the switching device can be provided by switch lugs similar to lugs 14 and 15 as shown in FIG. 2, and the exposure time automatically regulated by galvanometer 47 is based upon the L normal motion picture operating speed of 16 frames per second. Two additional switching positions L32 and L48 are also provided to respectively provide 32 and 48 frames per second. To compensate for the faster exposure speeds, compensating resistors 103 and 104 are connected into the circuit of photoelectric transducer 71 to adjust the operation of galvanometer 47 for these faster exposure speeds. In position L32 only compensating resistor 103 is connected in series with photoelectric transducer 71; whereas in the L48 position, both resistors 103 and 104 are connected in series with photoelectric transducer 71.

To provide the different speeds, the operation of motor 78 is regulated through a centrifugal switch 105, which is adjusted by means of cam disc 106 mounted upon shaft 11, as described in detail in FIG. 6. Capacitor 107 and resistor 108 are connected in parallel with centrifugal switch 105. Resistor 108 is always connected in series with motor 78, but it can be bypassed by switch 105 when it is closed.

As shown in FIG. 6, contact disc 95b including a movable contact arm 77b is mounted upon shaft 11 of consolidated switch 9b. Arm 77b slides in contact over stationary disc 96d whose terminal 97b is connected to galvanometer 47. Arm 77b accordingly slides in contact over arcuate segment 102 and over individual contacts 109 in each of the different switching positions. The contacts are shaped to engage each other in a detent fashion to momentarily maintain the switch in each of the various positions indicated in FIG. 4.

The means for adjusting the centrifugally operated switch includes an adjusting lever 112 having a follower projection 110 rotatably mounted upon stationary pivot 111. Follower projection 110 engages a cam 106 which is mounted on switching shaft 11. Adjusting lever 112 includes a geared segment 113 which engages pinion 114 secured to threaded shaft 115 which is engaged within stationary nut 116.

The centrifugally operated switching arrangement includes a centrifugal governor 118 mounted upon shaft 117 of motor 78. The weights 119 of governor 118 are connected to sleeve 120 by means of a linkage which moves the sleeves 120 axially in accordance with the speed of rotation of weights 119. Pin 121 inserted to slide through the hollow shaft of governor 118 is connected to sleeve 120 and moves axially with it. Pin 121 reacts against the end of rotatable lever 122, which is rotatably mounted upon stationary pivot 123 and is urged by tension spring 124 in a direction which opposes the direction of movement of pin 121 by the force of the centrifugal weights 119.

A spring contact 125 is disposed between threaded shaft contact 115A and lever 122. Contact spring 125 is biased free of contact end 115A of threaded shaft 115, but tension spring 124 is strong enough to maintain contacts 125A and 115A closed when the speed of motor 78 is not great enough to force lever 122 away from contact spring 125, such as when it is stopped or its speed is below a predetermined operating speed. When the predetermined speed to which governor 118 is set is exceeded, lever 122 is rotated away from contact 125 by pin 121; and spring 125 lifts itself away from contact 115A thereby disconnecting the motor from its source of power 78, which accordingly slows it down. When the motor slows down enough to allow contacts 115 and 125 to close again, the resistor 108 is again shunted out. The axial position of contact 115 determines the speed at which switch contacts 115A and 125 open, and this axial position is regulated by the annular position of cam 106 adjusted by consolidated switch 9b through its various steps 106a, 106b and 106c respectively corresponding to 16, 32 and 48 frames per second.

In FIG. 6 is also shown another method of regulating the exposure in accordance with the speed of operation of the motor. For this purpose another cam 126 is secured to shaft 11, and a follower projection 127 of diaphragm adjusting lever 128 for iris type diaphragm 129 is accordingly maintained in contact with cam 126 by spring 130. Cam 126 and follower 127 accordingly adjust the amount of light striking photoelectric transducer 71 in accordance with the speed of operation of the camera motor. This light dimming device for the photoelectric transducer may be used instead of resistors 103 and 104 shown in FIG. 5 for compensating the automatic diaphragm adjusting device with reference to the speed of operation of the motor. Basically any type of illumination compensating device may be used for adjusting the galvanometer operation in accordance with the change in illumination caused by changes in camera shutter operating speeds. This permits the galvanometer 47 to be directly connected to switch 9b, and its operation compensated in each of the different speeds of shutter operation by elements corresponding to these different speeds for changing or varying electrical or illumination-receiving characteristics. Dimming devices connected directly in front of the transducer may be used instead of a diaphragm, such as rotatable optical wedges or prisms. Also, different transducers for each of the different speeds can be connected either independently or in combinations with the galvanometer.

Within the spirit of this invention many other devices may be provided for controlling the exposure release and varying the camera speed as long as the different functions of the camera are governed by a consolidated switch which has a safety position in which the exposure meter is isolated to prevent excessive drain upon the battery when it is not being used.

What is claimed is:

1. A control arrangement for a motion picture camera incorporating a battery-operated exposure meter and an automatic exposure-regulating device actuated thereby comprising a battery, a testing resistor, a consolidated control device having a number of separate positions corresponding to different conditions of operation and test of said camera, one of said positions being connected to energize operation of said camera, another of said positions being a testing position arranged to connect said battery to said exposure meter through said testing resistor for indicating the operative condition of said battery, said consolidated control device also including a safety position which is arranged to isolate said battery for preventing its discharge when said camera is not in operation, a reset spring being connected to said consolidated control device, and said reset spring being adjusted to react against said consolidated control device for urging it from said battery testing position to said safety position.

2. An arrangement as set forth in claim 1 wherein said camera includes a release mechanism for actuating its operation an interlocking device is provided for inactivating said camera release mechanism, and said consolidated control device with said release mechanism being connected to an interlocking device for preventing operation of said camera by said release mechanism when said consolidated control device is adjusted to said safety position.

3. An arrangement as set forth in claim 2 wherein said interlocking device includes an interlocking disc, said disc having lugs extending from it, said consolidated control device incorporating switching means controlling the mode of connection of said battery, and said lugs operatively engaging said interlocking device and said switching means for controlling them to operate in accordance with the position of said consolidated control device.

4. An arrangement as set forth in claim 3 wherein a double throw switch including a central power contact is provided for connecting power alternately to an automatic exposure control device and to a battery testing circuit, and one of said lugs moving said central power contact from said automatic control device to said battery testing position in accordance with the phase of operation of said consolidated control device.

5. An arrangement as set forth in claim 4 wherein said double throw switch includes an automatic control device circuit contact, said lugs are constructed and arranged to cause said central power contact to engage said automatic control device circuit contact for energizing said automatic control device circuit in all positions of said consolidated control device except a safety position and said battery testing position, and in said central safety position said power contact being disposed in a position which is isolated from both of said other contacts.

6. An arrangement as set forth in claim 1 wherein said motion picture camera is driven by an electric motor energized by a separate battery, said consolidated control device including another testing position, in said testing positions said consolidated control device connecting said exposure meter with said separate motor battery and isolating it from said motor for testing the condition of said separate motor battery.

7. An arrangement as set forth in claim 6 wherein a compensating resistor is provided, and said compensating resistor being connected in parallel with said exposure meter.

8. An arrangement as set forth in claim 6 wherein said exposure meter includes indicating areas for battery testing and exposure indicating, and compensating resistors being provided separately in each of said battery testing positions for causing a single indicating mark to indicate minimum operative values for both of said batteries.

9. An arrangement as set forth in claim 6 wherein said separate battery testing positions are provided on opposite sides of a safety position, and a double acting reset spring being provided for urging said consolidated control device from each of battery testing positions into said safety position.

10. An arrangement as set forth in claim 9 wherein said double acting spring is stationary, and a movable element of said consolidated control device including a pair of projections disposed parallel to its axis contacts said spring.

11. An arrangement as set forth in claim 6 wherein said consolidated control device includes several switching positions for operating said motor at different speeds, and compensating resistors being provided in said circuit to said exposure meter which are selectively connected into said circuit to vary the indication of said exposure meter in accordance with the speed of said camera.

12. An arrangement as set forth in claim 11 wherein compensating resistors are selectively connected in series with said exposure meter in accordance with the speed to which said consolidated control device is set.

13. An arrangement as set forth in claim 11 wherein light dimming devices are connected in front of the photoelectric transducer of said exposure meter, and said dimming device being operated by said consolidated control device to vary the output of said transducer in accordance with the speed of said camera.

14. An arrangement as set forth in claim 13 wherein said consolidated control device includes a rotatable shaft, said dimming device including a diaphragm in front of the transducer, and a cam and follower device connects said diaphragm with said transducer.

15. An arrangement as set forth in claim 14 wherein said camera includes a speed controlling centrifugal switch having a movable contact, another cam and follower device and motion transmission means connecting said shaft to said centrifugal switch for varying the axial speed central setting of said movable contact in accordance with the angular phase of operation of said consolidated control device.

16. An arrangement as set forth in claim 1 wherein said consolidated control device includes a sliding contact and a cam which respectively operate individual contacts for controlling the functions of said camera.

17. An arrangement as set forth in claim 16 wherein said sliding contact is resilient in a direction normal to its direction of switching action and is curved to provide a detent action.

References Cited by the Examiner
UNITED STATES PATENTS

| | | | |
|---|---|---|---|
| 2,333,772 | 11/43 | Eaton. | |
| 2,518,717 | 8/50 | Rath | 88—16 |
| 2,559,911 | 7/51 | Whittel | 88—16 |
| 2,971,432 | 2/61 | Blank | 88—16 |
| 2,973,699 | 3/61 | Nerwin | 95—10 |
| 3,044,347 | 7/62 | MacMillin | 95—10 |
| 3,063,004 | 11/62 | Vic | 324—29.5 |

NORTON ANSHER, *Primary Examiner.*

EMIL G. ANDERSON, *Examiner.*